(12) United States Patent
Suzuki et al.

(10) Patent No.: US 7,270,213 B2
(45) Date of Patent: Sep. 18, 2007

(54) WHEELED VEHICLE WITH FOOT REST

(75) Inventors: Takahiko Suzuki, Shizuoka (JP); Haruhito Takahashi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 171 days.

(21) Appl. No.: 11/126,697

(22) Filed: May 11, 2005

(65) Prior Publication Data

US 2005/0269800 A1    Dec. 8, 2005

(30) Foreign Application Priority Data

Jun. 4, 2004  (JP) .............................. 2004-167038
Jun. 15, 2004 (JP) .............................. 2004-177586

(51) Int. Cl.
*B62D 61/02* (2006.01)
*B62J 25/00* (2006.01)
*B62K 11/00* (2006.01)
*B62M 7/00* (2006.01)

(52) U.S. Cl. ........................ 180/219; 280/291

(58) Field of Classification Search ................ 180/219, 180/182; 280/291, 304.3
See application file for complete search history.

(56) References Cited

U.S. PATENT DOCUMENTS

| 6,068,075 | A  | * | 5/2000  | Saiki ............................ 180/219 |
| 6,234,266 | B1 | * | 5/2001  | Saiki ............................ 180/219 |
| 6,578,652 | B1 | * | 6/2003  | Kobacker et al. ........... 180/219 |
| 6,688,628 | B2 | * | 2/2004  | Burkett ........................ 280/291 |
| 6,688,629 | B2 | * | 2/2004  | Essinger ...................... 280/291 |
| 6,719,316 | B1 | * | 4/2004  | Anthony ...................... 280/291 |
| 6,843,495 | B2 | * | 1/2005  | Tokumura et al. .......... 280/291 |

FOREIGN PATENT DOCUMENTS

JP    2001-097267    4/2001

* cited by examiner

*Primary Examiner*—Lesley D. Morris
*Assistant Examiner*—Marc A. Scharich
(74) *Attorney, Agent, or Firm*—Keating & Bennett, LLP

(57) ABSTRACT

A wheeled vehicle includes a frame having first and second frame sections. The first frame section extends substantially vertically. The second frame section extends substantially horizontally and rearward from a top portion of the first frame section. A seat is supported by the second frame section. A power unit powers the vehicle. The power unit is disposed below the seat. A side cover covers the second frame section. The side cover extends along the second frame section to define a space between a bottom of the side cover and a top of the power unit. A stay extends generally rearward from the first frame section. At least a portion of the stay is disposed in the space. A foot rest extends from the stay. The stay includes first and second portions. The second portion is arranged higher than the first portion. The stay is attached to the first frame section at the first portion. The foot rest is attached to the second portion of the stay.

20 Claims, 11 Drawing Sheets

WHEELED VEHICLE WITH FOOT REST

PRIORITY INFORMATION

The present application is based on and claims priority under 35 U.S.C. § 119 to Japanese Patent Applications No. 2004-167038, filed on Jun. 4, 2004, and No. 2004-177586, filed on Jun. 15, 2004, the entire contents of which are expressly incorporated by reference herein.

BACKGROUND OF THE INVENTION

1. Field of the Invention

The present invention relates to a wheeled vehicle with a foot rest, and more particularly, to a wheeled vehicle having a foot rest for a rider of the vehicle.

2. Description of Related Art

Wheeled vehicles such as, for example, scooters and mopeds typically have a frame that supports front and rear wheels, an engine, a seat and other components. The engine is coupled to a transmission to define an engine unit. The engine unit and rear wheel are swingably suspended below the seat.

The seat may be a tandem seat upon which a primary rider and a secondary rider straddle. Typically, the frame of the scooters and the mopeds are covered with multiple covers. One of the covers defines a floor step for a scooter. The primary rider places his or her feet on the floor step while driving the scooter. In addition, a pair of foot boards extend from the covers on both sides of a moped, and the primary rider places his or her feet on the foot boards while driving the moped.

The scooter or the moped includes a pair of foot rests for the secondary rider. For example, Japanese Patent Publication No. P2001-97267A discloses an example of foot rests for the secondary rider. As shown in the publication, the foot rests are contiguously formed with the foot step or the foot boards. The foot rests extend upwardly and rearwardly from the foot step or the foot boards to avoid interference with the engine unit that is located below the seat. Thus, the secondary rider may feel cramped in a confined space. In other arrangements, the foot rests may be provided separately from the foot step or the foot boards and may be affixed to the frame under the covers. However, only a few locations are available for the foot rests due to the covers. Thus, the secondary rider may be uncomfortable because the locations of the foot rests are not suitable for the rider. For instance, the foot rests may not be sufficiently spaced from a hip position of the rider.

SUMMARY OF THE INVENTION

To overcome the problems described above, preferred embodiments of the present invention provide a wheeled vehicle including a foot rest that provides a comfortable position for a secondary rider of the vehicle on which to place his or her feet without being hampered by any cover of the vehicle.

A preferred embodiment of the present invention provides a wheeled vehicle including a frame having first and second frame sections. The first frame section extends generally vertically. The second frame section extends generally horizontally and rearwardly from a top portion of the first frame section. A seat is supported by the second frame section. A power unit is arranged to power the vehicle. The power unit is located below the seat. A side cover is arranged to cover the second frame section. The side cover extends generally along the second frame section to define a space between a bottom of the side cover and a top of the power unit unit. A stay extends generally rearwardly from the first frame section. At least a portion of the stay is located in the space. A foot rest extends from the stay. The stay includes first and second portions. The second portion is located higher than the first portion. The stay is attached to the first frame section at the first portion. The foot rest is attached to the second portion of the stay.

In accordance with another preferred embodiment of the present invention, a wheeled vehicle includes a frame having first and second frame sections. The first frame section extends generally vertically. The second frame section extends generally horizontally and rearward from a top portion of the first frame section. A seat is supported by the second frame section. A power unit is arranged to power the vehicle. The power unit is located below the seat. A side cover is arranged to cover the second frame section. The side cover extends generally parallel to the second frame section. A stay extends from the first frame section so as to be located below the side cover and above the power unit. A foot rest extends from the stay.

These and other features, elements, characteristics and advantages of the present invention will become more apparent from the following detailed description of preferred embodiments of the present invention with reference to the attached drawings.

DETAILED DESCRIPTION OF PREFERRED EMBODIMENTS

With reference to FIGS. 1-7, an overall construction of a moped 30 configured in accordance with a preferred embodiment of the present invention is described. The moped 30 merely exemplifies one type of a wheeled vehicle. A foot guide structure described below is suitable for other types of wheeled vehicles such as, for example, motorcycles and scooters. Such applications will be apparent to those of ordinary skill in the art in view of the description herein.

As used throughout this description, the terms "forward" and "front" mean at or to the side of the leading end of the moped 30, and the terms "rear" and "rearward" mean at or to the opposite side of the front side, unless indicated otherwise or otherwise readily apparent from the context used. Also, as used in this description, the term "horizontally" means that the subject portions, members or components extend generally parallel to the ground when the moped 30 is upright. The term "vertically" means that portions, members or components extend substantially perpendicular to those that extend horizontally.

Figure 4:
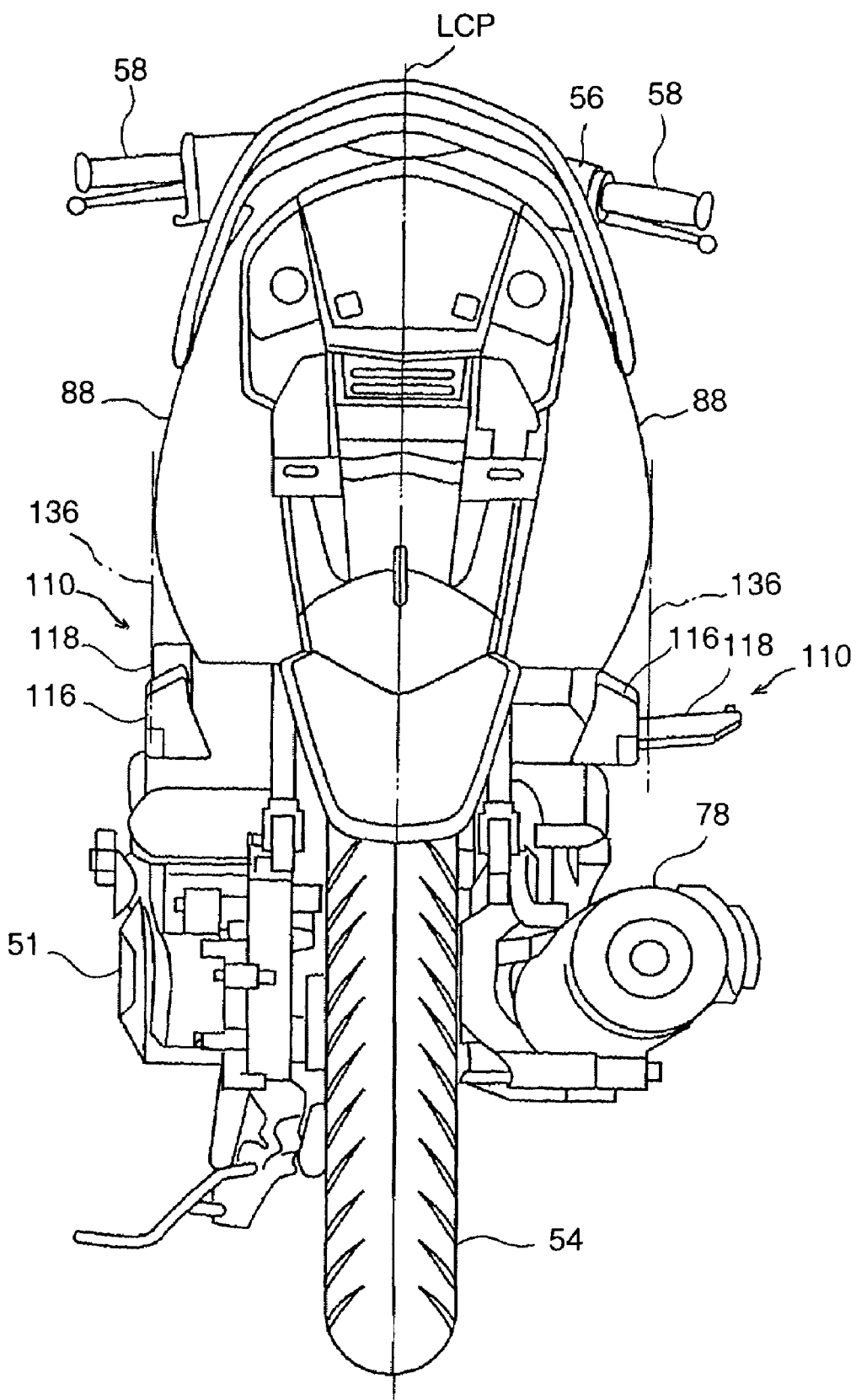
FIG. 4 illustrates a rear view of the moped of FIG. 1.
Figure 5:
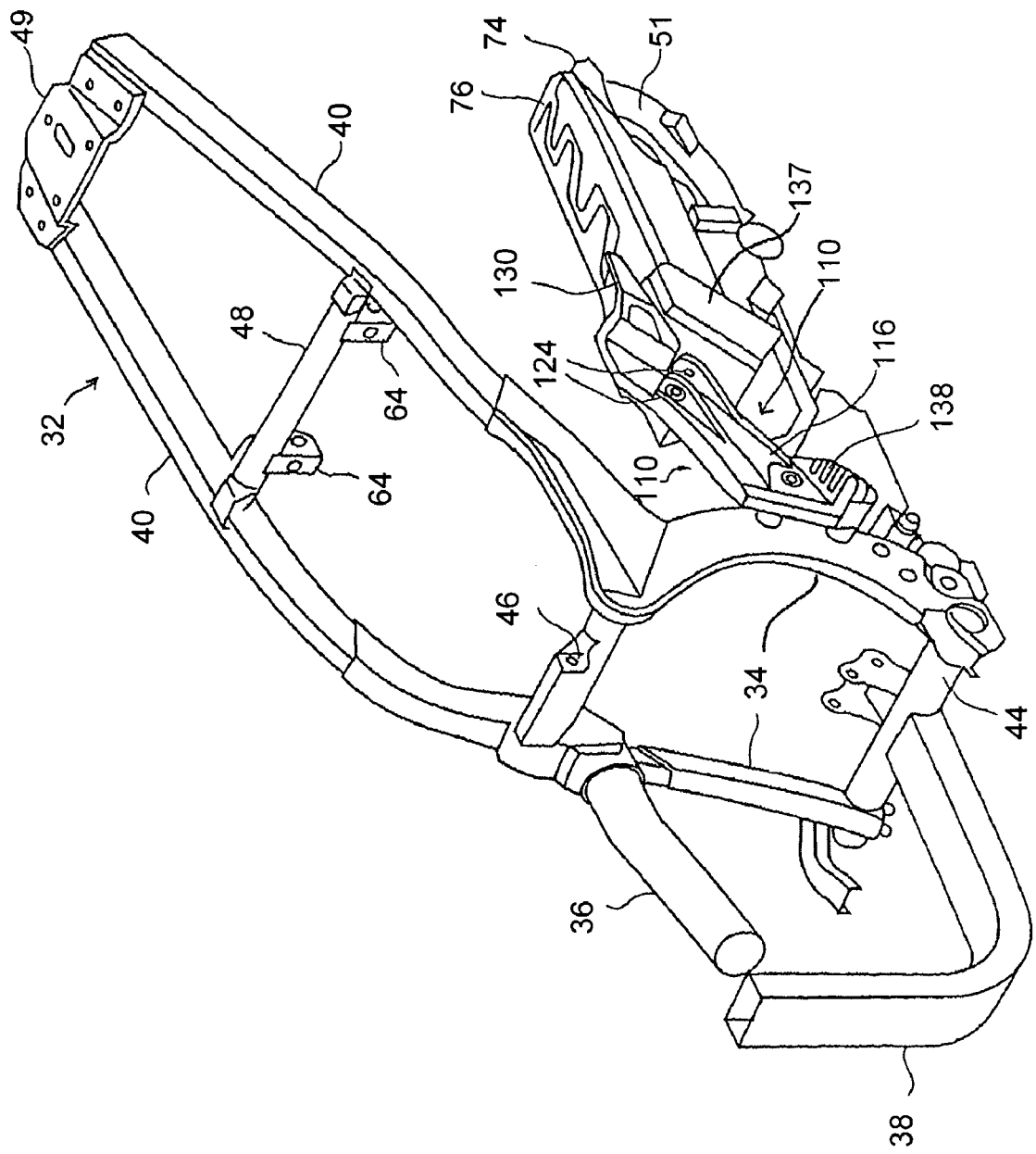
FIG. 5 illustrates a perspective view of a frame portion of the moped, the foot rest assembly and a power unit from a forward left side, with a foot rest body not being shown in this figure.
Figure 6:
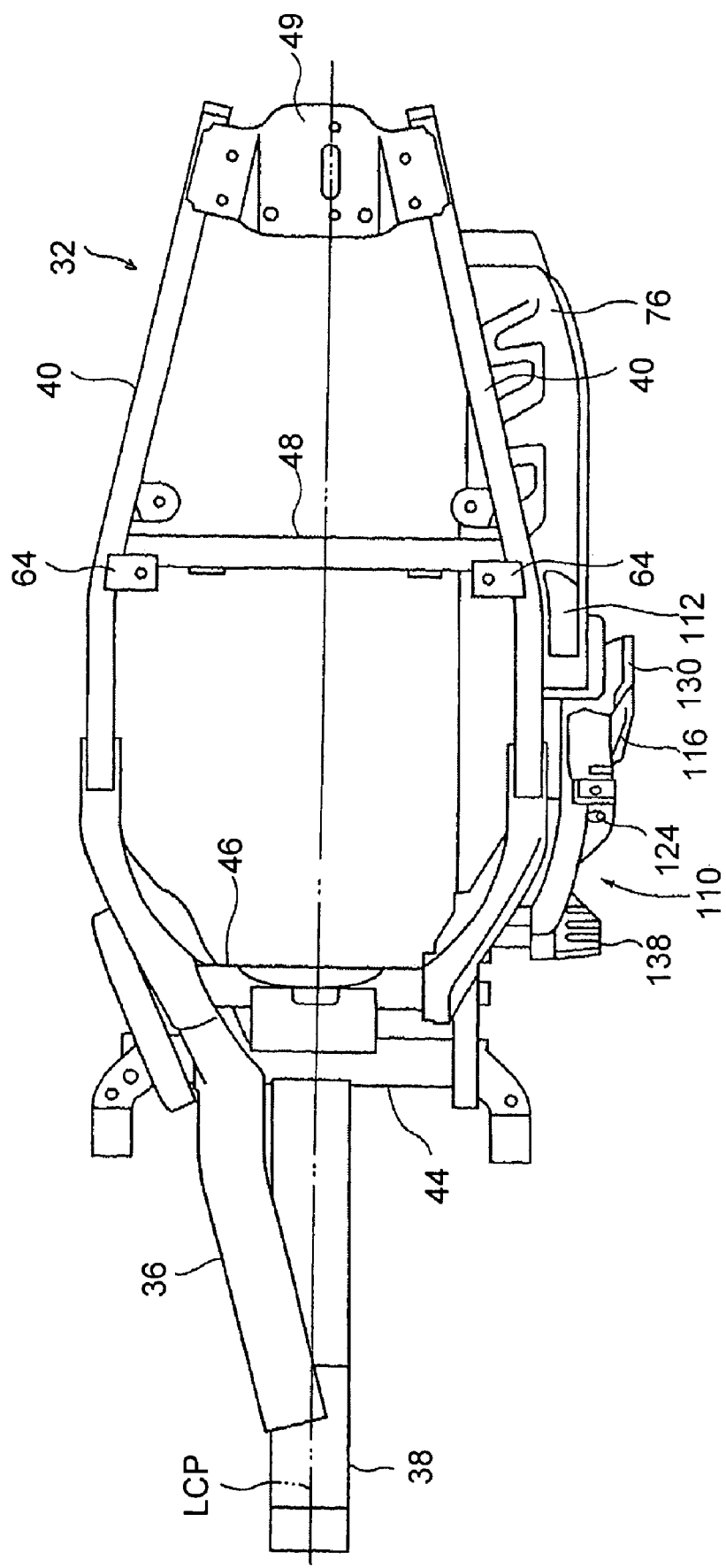
FIG. 6 illustrates a top plan view of the frame portion of FIG. 5 including the foot rest assembly and a foot guide, with the foot rest body not being shown in this figure.

With reference to FIGS. 1 and 4-6, the moped 30 includes a frame 32 that defines a base of the moped 30. FIGS. 5 and 6 show center and rear portions of the frame 32. The frame 32 preferably includes a pair of bracket sections 34, a main frame section 36, a sub frame section or down-tube 38, a pair of seat rails 40, a pair of foot board bases (not shown), a lower cross bar 44, an upper cross bar 46, a mid cross bar 48 and a cross member 49.

Both of the bracket sections 34 extend substantially vertically and are connected with each other through the lower and upper cross bars 44, 46. The bracket sections 34 support a power unit and a rear wheel 50. In the illustrated preferred embodiment, the power unit is preferably an engine unit 51 which includes an internal combustion engine and a transmission. However, an electric motor, for example, can replace the engine unit 51. The rear wheel 50 is preferably a propulsive wheel in the illustrated preferred embodiment, and the engine unit 51 powers the rear wheel 50. A center of the illustrated engine unit 51 is arranged substantially on a longitudinal center plane LCP (FIGS. 4 and 6) of the moped 30 that extends vertically and from front to back when the moped 30 stands on the ground. However, a rear portion of the engine unit 51 is offset to the left hand side relative to the longitudinal center plane LCP.

Figure 7:
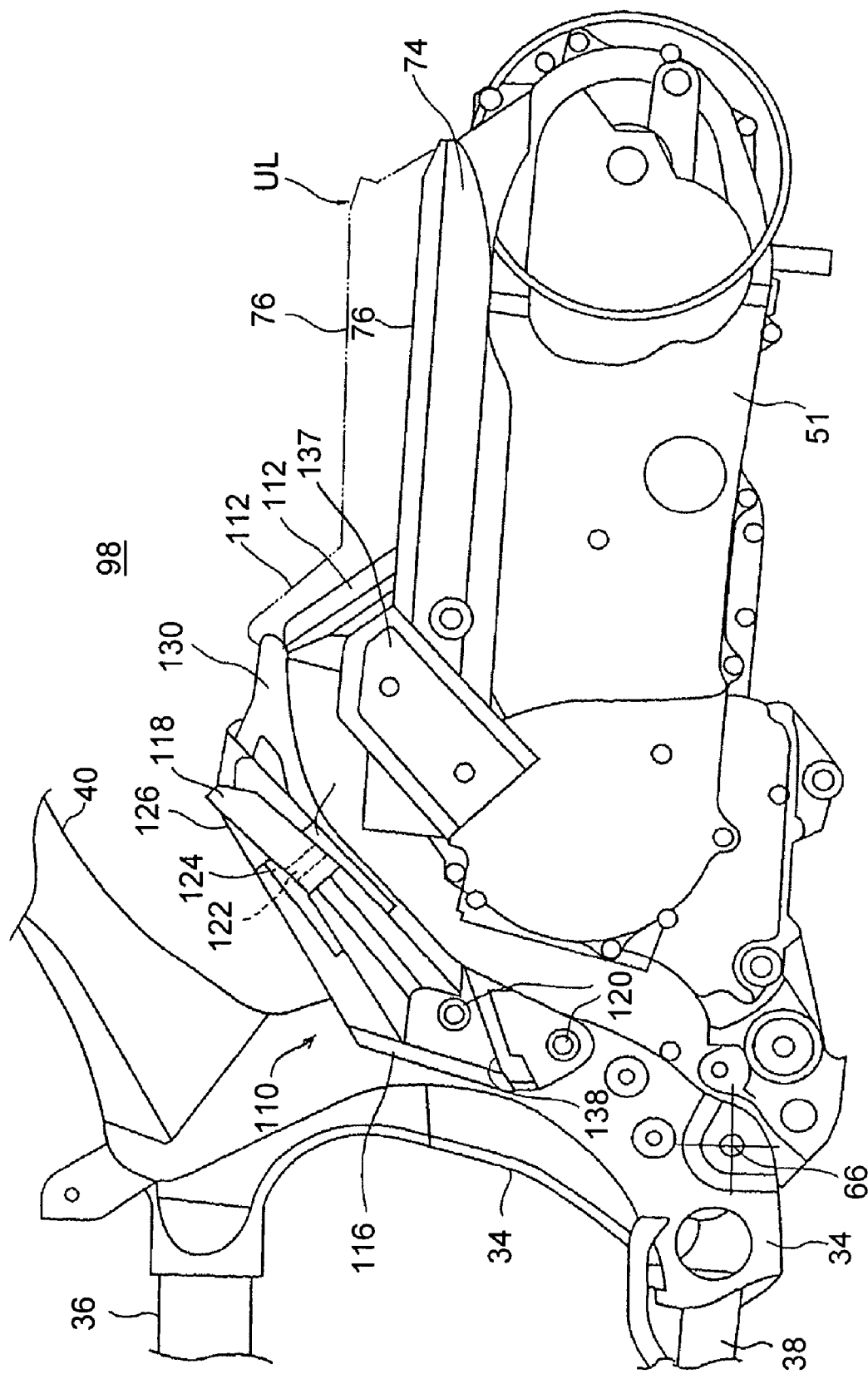
FIG. 7 illustrates a partial side elevation view of the moped showing the foot rest assembly attached to the frame portion and the foot guide attached to the power unit.
Figure 8:
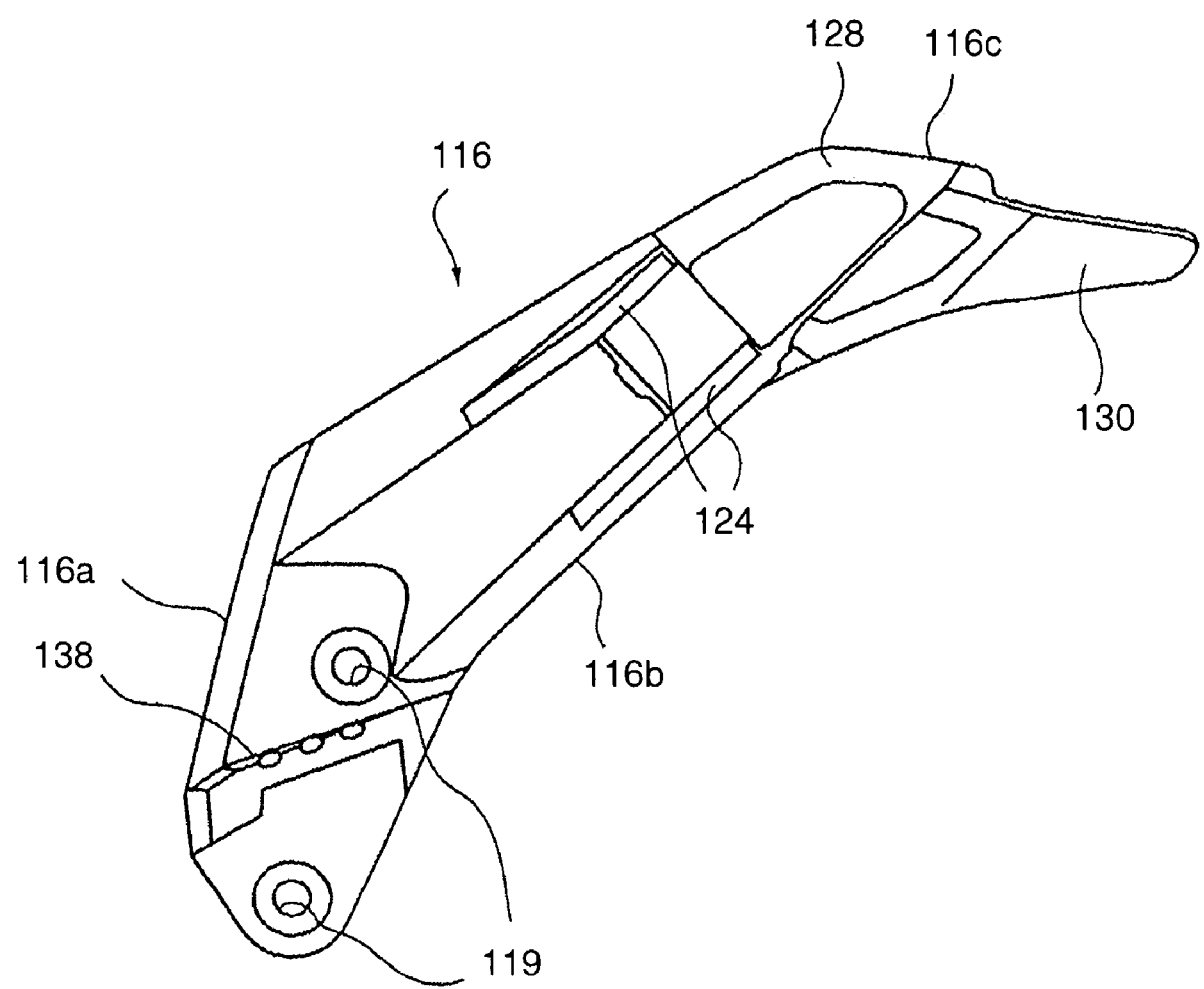
FIG. 8 illustrates an enlarged side elevation view of the foot rest assembly of FIG. 7, with the foot rest body not being shown in this figure.
Figure 9:
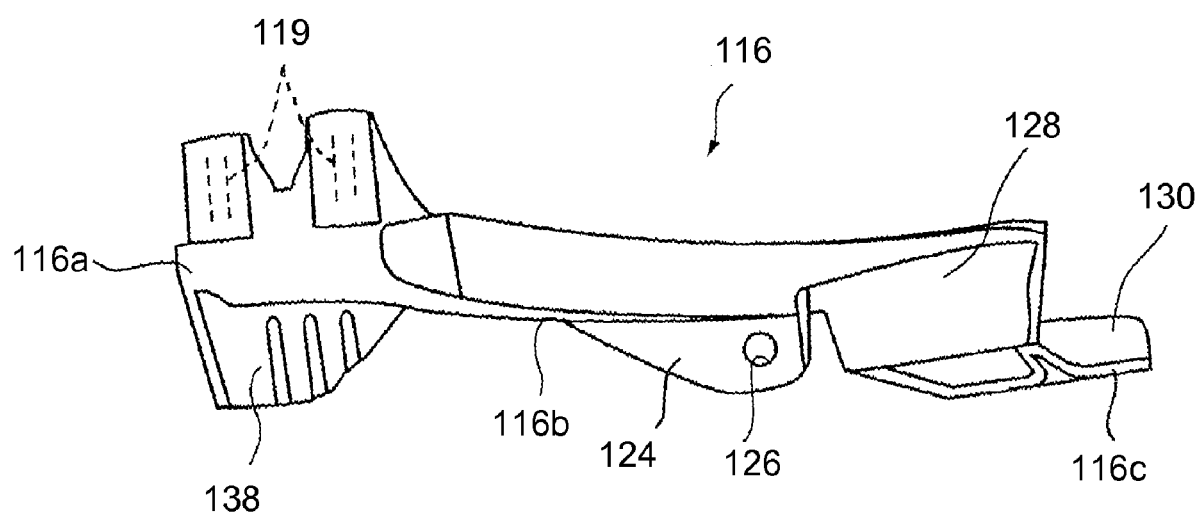
FIG. 9 illustrates a top plan view of the foot rest assembly of FIG. 7, with the foot rest body not being shown in this figure.
Figure 10:
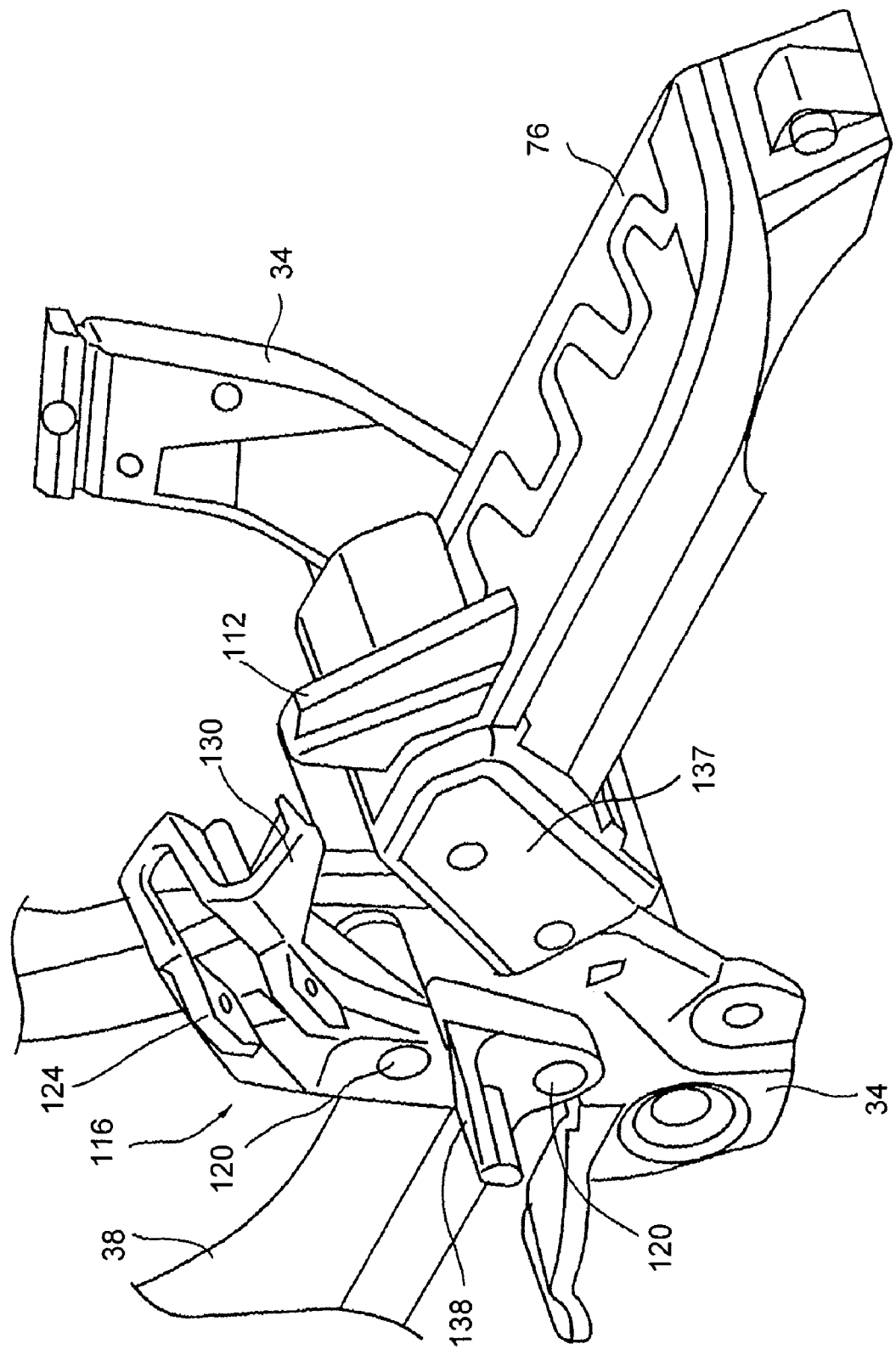
FIG. 10 illustrates a perspective view of the moped showing the foot rest assembly and the foot guide, with the foot rest body not being shown in this figure.

As best seen in FIG. 7, the engine unit 51 preferably swings up and down or pivots about a swing axis 66 that extends transversely at respective bottom ends of the bracket sections 34. The rear portion of the engine unit 51 preferably accommodates the axle of the rear wheel 50 via, for example, an output shaft of the engine unit 51. Preferably, a suspension 68 extends between the engine unit 51 and the seat rail 40 on the left hand side of the moped 30. The phantom line of FIG. 7 schematically shows the upper limit UL of the pivotal movement of the engine unit 51.

The main frame section 36 preferably includes a horizontal portion and a vertical portion. The horizontal portion extends forwardly from a top end of the bracket section 34 on the right hand side. Although not shown in the figures, the vertical portion extends upwardly from a forward end of the horizontal section. A head pipe is welded to a top portion of the vertical portion. The head pipe accommodates a steering shaft that includes a pair of front forks 52 at a bottom portion thereof. The axle of a front wheel is interposed between the front forks 52. A handle bar 56 extends substantially horizontally from the top portion of the steering shaft. The handle bar 56 includes handle grips 58 at respective ends thereof. The rider steers the moped 30 by turning the handle bar 56. The handle bar 56 preferably includes a throttling device that controls the power of the engine, and brake levers that stop the rotation of the front wheel 54 and a rear wheel 50 using braking devices.

The illustrated sub frame section 38 includes horizontal and vertical portions. The horizontal portion preferably extends forwardly from the cross bar 44 below the horizontal portion of the main frame section 36. The vertical portion extends upwardly toward the vertical portion of the main frame section 36 from a forward end of the horizontal section. The vertical portion of the sub frame section 38 is coupled to the vertical portion of the main frame section 36.

The foot board bases preferably extend forwardly from the respective bottom ends of the bracket sections 34, although not shown in the figures. Preferably, a bracket extending transversely from the horizontal portion of the sub frame section 38 supports a front portion of each foot board base.

The seat rails 40 preferably are connected with each other by the mid cross bar 48 at the middle portions thereof and through the cross member 49 at the rear end portions thereof. The mid cross bar 48 preferably includes two seat brackets 64. The seat rails 40 support a seat 62. Preferably, a mid portion of the seat 62 is detachably affixed to the seat brackets 64, and a rear end portion of the seat 62 is detachably affixed to the cross member 49.

Figure 1:
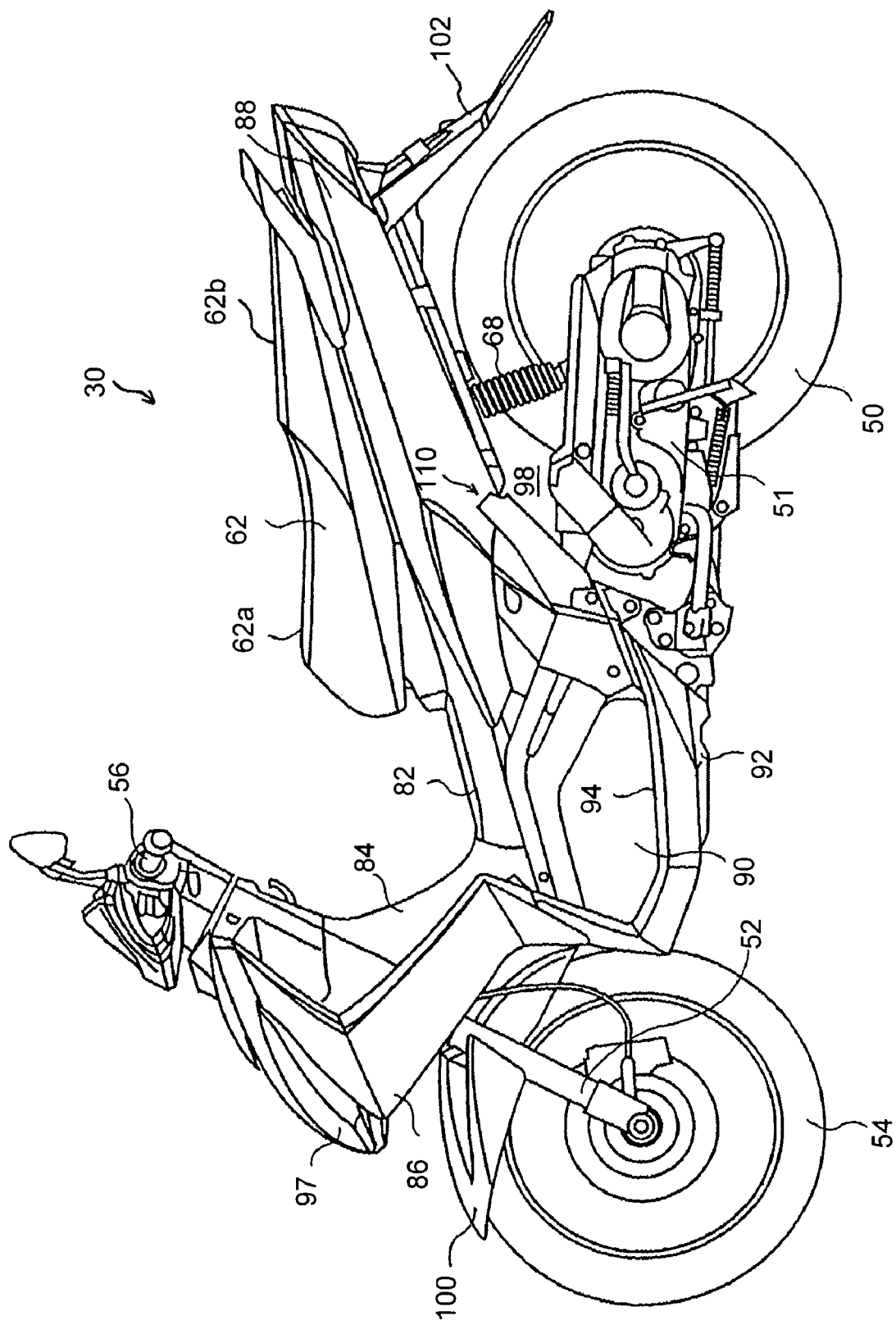
FIG. 1 illustrates a side elevation view of a moped configured in accordance with a preferred embodiment of the present invention.
Figure 2:
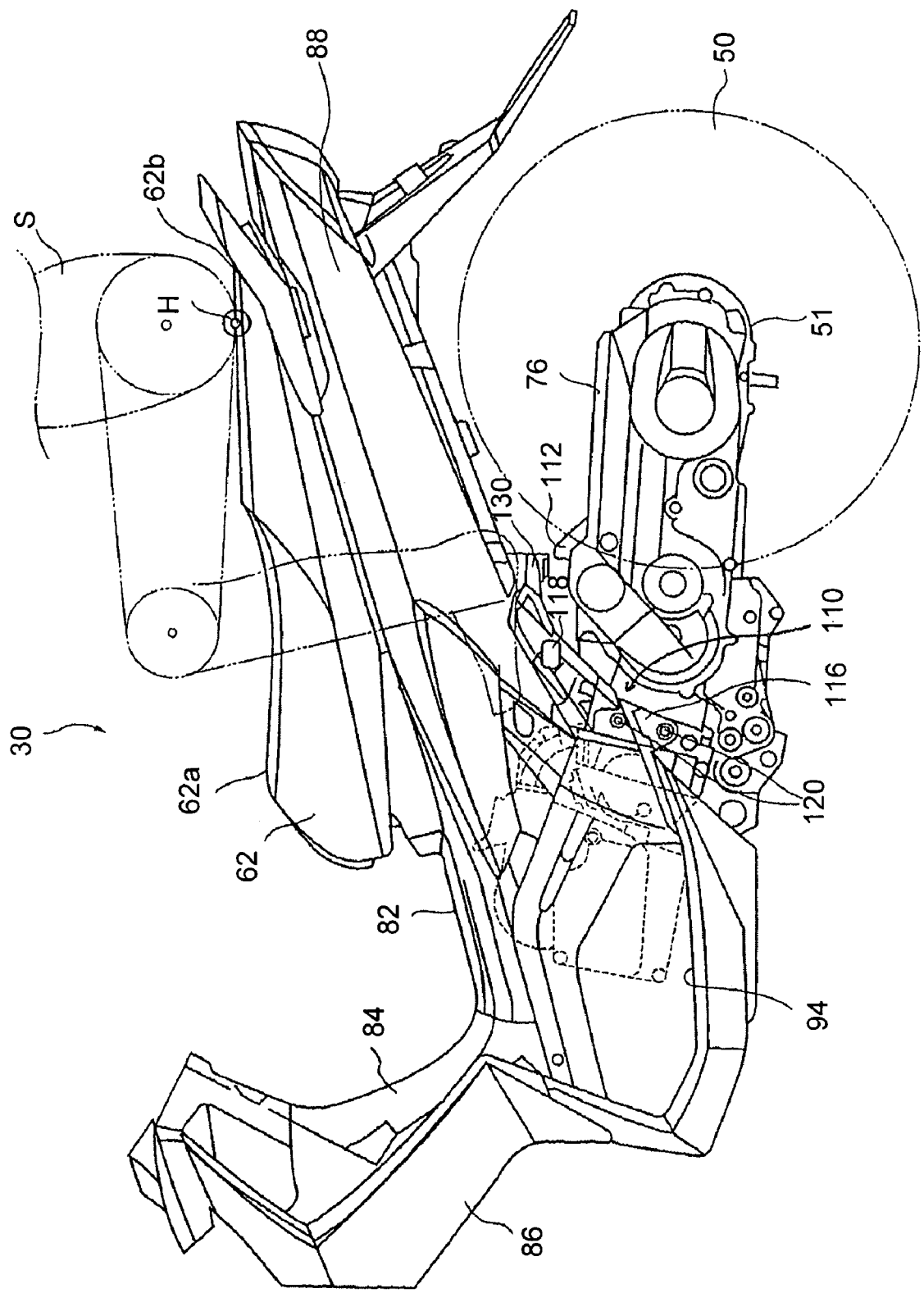
FIG. 2 illustrates a side elevation view of a major portion of the moped of FIG. 1 with a secondary rider partially shown in phantom.
Figure 3:
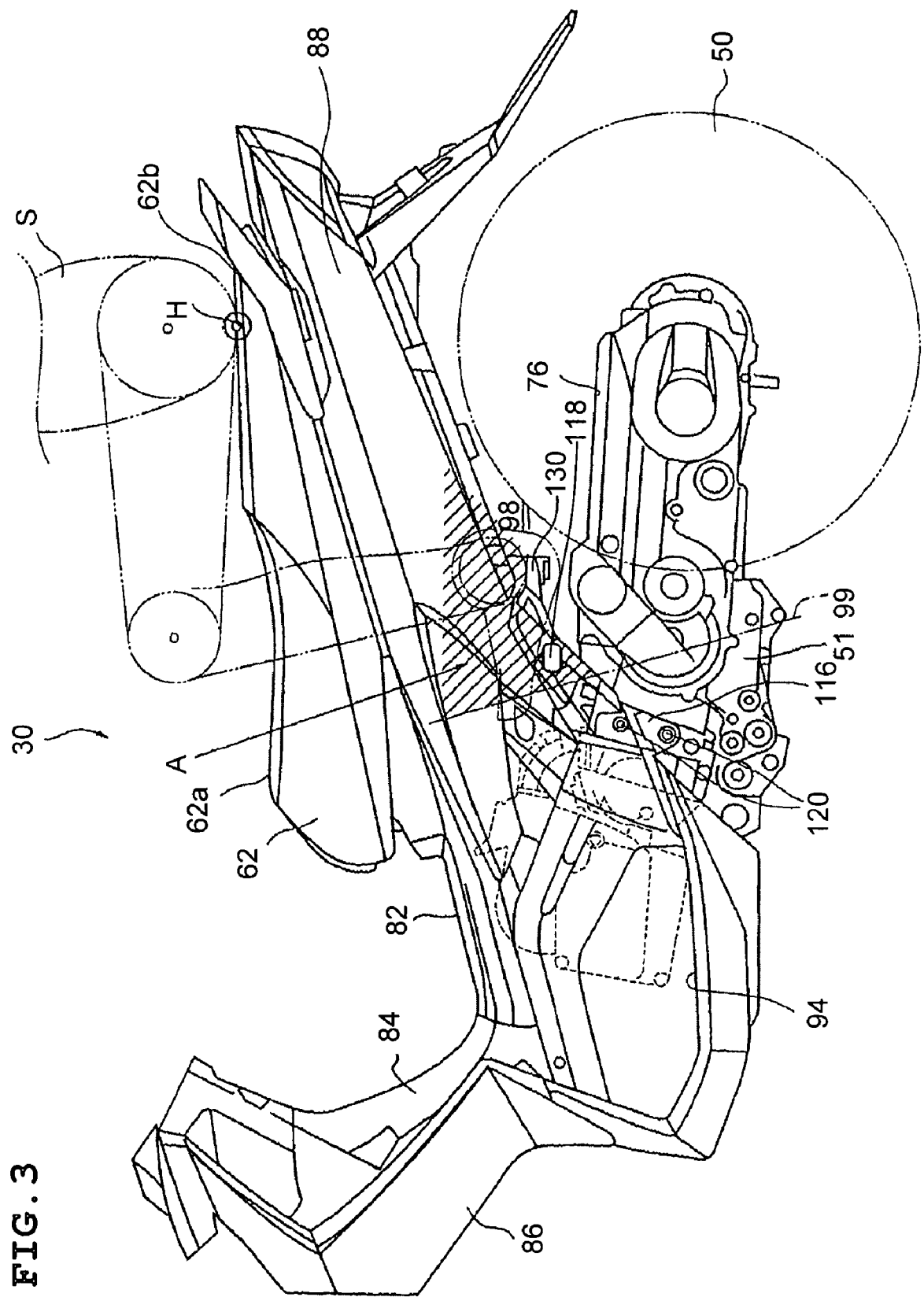
FIG. 3 illustrates a similar elevation view of the major portion of the moped showing a proper position of a foot rest assembly for a secondary rider.

The seat 62 is preferably a tandem type such that two riders, i.e., primary and secondary riders, can straddle and sit on the seat 62. The secondary rider is indicated by the reference mark S of FIGS. 2 and 3. In the illustrated preferred embodiment, the seat 62 includes a front seat portion 62a for the primary rider and a rear seat portion 62b for the secondary rider S. The rear seat portion 62b is preferably arranged to be slightly higher than the front seat portion 62a. As shown in FIGS. 2 and 3, when the secondary rider S straddles the rear seat portion 62b, his or her hip is located approximately at a point H.

The vertical portion of the main frame section 36 and the horizontal and vertical portions of the sub frame section 38 preferably extend on and along the longitudinal center plane LCP. The horizontal portion of the main frame section 36 extends to the longitudinal center plane LCP from the bracket section 34. The respective bracket sections 34, seat rails 40 and foot board bases are transversely spaced from each other so as to be arranged substantially symmetrically on both sides of the longitudinal plane LCP. That is, the moped 30 in the illustrated preferred embodiment is generally symmetrical relative to the longitudinal center plane LCP. Those components of the frame 32 are preferably welded with each other or joined by proper fasteners such as, for example, bolts and nuts.

The frame 32 preferably includes various cross-sectional shapes. For example, the illustrated bracket sections 34 preferably have a cross-sectional shape of the letter L or U. The illustrated main and sub frame sections 36, 38 and the head pipe preferably have a substantially round cross-sectional shape or a substantially rectangular cross-sectional shape. The illustrated seat rails 40 preferably have a substantially U-shaped cross-sectional shape.

In the illustrated preferred embodiment, a forward portion of the engine unit 51 extends forwardly through the bracket sections 34 and is arranged in a space between the horizontal portion of the main frame section 36 and a horizontal portion of the sub frame section 38 as indicated by dotted lines of FIGS. 2 and 3. In addition, components for the engine unit 51 such as, for example, an air cleaner may also be arranged in the space.

In addition, the engine unit 51 includes a top cover 74 made of metal. Preferably, an additional cover 76 preferably made of resin is provided over the top cover 74. Additionally, an exhaust system is provided to discharge exhaust gases of the engine unit 51. A muffler 78 (FIG. 4) of the exhaust system preferably is disposed on a right hand side of the moped 30 so as to oppose to the rear portion of the engine unit 51.

With reference to FIGS. 1-4, multiple covers are provided to cover the frame 32. The covers in the illustrated preferred embodiment include a center cover 82, a leg shield 84, a front cover 86, a pair of side covers 88, a pair of lower covers 90 and a bottom cover 92. A pair of foot boards 94 is also provided to support the primary rider's feet.

The center cover 82 covers a top surface of the horizontal portion of the main frame section 36 and front portions of the respective seat rails 40. The leg shield 84 covers a rear surface of the vertical portion of the main frame section 36. The front cover 86 covers a front surface of the vertical portion of the main frame section 36. The vertical portion of the main frame section 36 is interposed between the leg shield 84 and the front cover 86.

The side covers 88 extend along the seat rails 40 and are substantially parallel to the seat rails 40 so as to cover respective side surface of the seat rails 40. In the illustrated preferred embodiment, each side cover 88 is configured to define a space 98 between a bottom of the side cover 88 and a top of the engine unit 51. In other words, the side covers 88 do not cover the rear wheel 50 or the suspension 68. It should be noted that the term "space 98" means not only the space defined between the bottom of the side covers 88 and the top of the engine unit 51, but also imaginary spaces extending transversely outward from the space defined between the bottom of the side cover 88 and the top of the engine unit 51 on both sides of the moped 30. As shown in FIG. 3, the space 98 is arranged behind the plane 99 that extends transversely in the illustrated preferred embodiment. Each side cover 88 preferably protrudes outward so as to be spaced from the longitudinal center plane LCP.

In the illustrated preferred embodiment, the center cover 82 and the side covers 88 preferably define an opening between the upper and mid cross bars 46, 48. A helmet storage box is preferably disposed below the opening. The rider thus can store his or her helmet in the storage box through the opening by removing the seat 62. The helmet storage box may be affixed to the seat rail 40.

The front cover 86 preferably includes a pair of recesses that are arranged forward in a forward portion thereof on both sides of the longitudinal center plane LCP. Head lamp assemblies 97 are inserted into the respective recesses so as to be located at the forward-most end of the front cover 86.

The lower covers 90 extend substantially vertically below the center cover 82 on both sides of the moped 30 to cover respective side surfaces of the bracket sections 34, the sub frame section 38, the forward portion of the engine unit 51 and the components of the engine unit 51. The bottom cover 92 extends substantially horizontally below the foot boards 94 to cover respective bottom surfaces of the bracket sections 34, the sub frame section 38, the forward portion of the engine unit 51 and the component of the engine unit 51. The center cover 82, the leg shield 84, the front cover 86, the side covers 88, the lower covers 90 and the bottom cover 92 cover the entire frame 32 of the moped 30.

The foot boards 94 extend below the lower covers 90 and extend transversely outward over the foot board bases. The foot boards 94 are foot rests for the primary rider. Each foot board 94 includes a horizontal surface 94a (FIG. 11) and is affixed to a top surface of each foot board base.

In the illustrated preferred embodiment, the moped 30 includes a front fender 100 and a rear fender 102, in addition to the above-described covers that cover the frame 32. The front fender 100 covers a top portion of the front wheel 54, and the rear fender 102 covers a rear top portion of the rear wheel 50.

The covers 82, 84, 86, 88, 90, 92, foot boards 94 and fenders 100, 102 are preferably made of resin. In the illustrated preferred embodiment, some covers such as, for example, the center cover 82, the leg shield 84 and the foot boards 94 are preferably made of PP (Poly-Propylene) resin, for example, to provide a desired amount of strength. Some other covers such as, for example, the front cover 86 and the side covers 88 are preferably made of ABS (Acrylonitorile-Butadiene-Styrene) resin, for example, so as to maintain an attractive appearance. This is because the ABS resin can be coated. In general, the PP resin is stronger than the ABS resin.

With continued reference to FIGS. 1-7 and with additional reference to FIGS. 8-11, foot rest assemblies 110 and a foot guide 112 will be described. In the illustrated preferred embodiment, the foot rest assemblies 110 are preferably disposed on both sides of the moped 30. The respective foot rest assemblies 110 are configured similarly to each other. Thus, only the foot rest assembly 110 on the left hand side will be described to represent both of the foot rest assemblies 110 unless indicated otherwise or otherwise readily apparent from the context. It should be noted, however, that the foot rest assembly 110 on the right hand side is in linear symmetry relative to the foot rest assembly 110 on the left hand side.

The foot rest assemblies 110 are preferably arranged to support respective feet of the secondary rider S. As best shown in FIG. 7, each foot rest assembly 110 preferably includes a stay 116 and a foot rest body 118.

The stay 116 preferably has a relatively long and narrow shape. The stay 116 extends obliquely upwardly and rearwardly. Preferably, a forward portion 116a extends upwardly, a mid portion 116b extends upwardly and rearwardly from the forward portion 116a and a rear portion 116c extends rearwardly from the mid portion 116b. Thus, the mid portion 116b is arranged to be higher than the forward portion 116a, and the rear portion 116c is arranged to be higher than the mid portion 116b. Also, at least a portion of the mid portion 116b and the entire rear portion 116c are preferably disposed in the space 98.

The stay 116 preferably includes two bolt holes 119 at the forward portion 116a. The bolt holes 119 are spaced apart from each other in a vertical direction. One of the bolt holes 119 is located at a bottom of the stay 116. The stay 116 is affixed to a side surface of each bracket section 34 by two bolts 120 screwed into the bolt holes 119.

The foot rest body 118 is preferably hinged to the mid portion 116b of the stay 116. As shown in FIG. 3, each foot rest body 118 preferably is arranged behind the plane 99 and in the space 98. The illustrated foot rest body 118 preferably has a substantially rectangular shape. A rubber material preferably covers the foot rest body 118. One end of the foot rest body 118 includes a pivot shaft 122 extending therethrough. Preferably, a pair of struts 124 extend outwardly from a side surface of the stay 116 and are substantially parallel to peripheral edges of the stay 116. Each strut 124 has an opening 126. The pivot shaft 122 is inserted into the opening 126. The foot rest body 118 can thus pivot relative to the stay 116. That is, the foot rest body 118 can move between an extended position and a retracted position.

The foot rest body 118 extends transversely outwardly in the extended position to support each foot of the secondary rider S. Preferably, a stopper is used to maintain the foot rest body 118 at the extended position. On the other hand, the foot rest body 118 extends upwardly and rearwardly along the side surface of the stay 116 in the retracted position. For the reader's convenience, in FIG. 4, the foot rest body 118 on the right hand side of the moped 30 is shown in the extended position, while the foot rest body 118 on the left hand side of the moped 30 is shown in the retracted position.

Each stay 116 preferably provides a recess 128 in the rear portion 116c to accommodate the foot rest body 118 at the retracted position. The recesses 128 enable the foot rest assemblies 110 to be more compact.

The stays 116 are indirectly affixed to the bracket sections 34 of the frame 32 via other members. Because the illustrated stays 116 are directly affixed to the bracket sections 34, no specific brackets for the stays 116 are necessary.

The illustrated rear portion 116c also defines a guide projection 130 extending rearward. Preferably, the guide projection 130 extends from a rearmost end of the stay 116. The guide projection 130 preferably has a beak shape. The guide projection 130 may be thinner than the remaining portions of the stay 116. As described in greater detail below, the guide projection 130 together with the foot guide 112 guides each foot of the secondary rider S such that the foot can be placed at the proper position.

In one variation, the guide projection 130 can be provided separately from the stay 116 and can directly extend from the bracket section 34 or the seat rail 40. In other words, the guide projection 130 is not necessarily integral with the stay 116.

Additionally, a heel guard 137 is preferably integrally formed with the resin cover 76 so as to be located at a side surface of the engine unit 51. The heel guard 137 prevents a heel of the secondary rider from directly touching the side surface of the engine unit 51.

When the secondary rider S straddles the rear seat portion 62b, the secondary rider S moves the foot rest bodies 118 to the extended position to place his or her feet onto the foot rest bodies 118. Each foot of the secondary rider S is positioned in an area A of FIG. 3 that is indicated by the cross-hatching while the secondary rider S straddles the rear seat portion 62b. The area A provides the most comfortable location for the secondary rider S to put his or her feet, because the area A is neither too far nor too near the secondary rider's hip that is located at the point H. When the secondary rider S gets off of the rear seat portion 62b, the rider S moves the foot rest bodies 118 to the retracted position, i.e., puts the foot rest bodies 118 into the recess 128.

As illustrated in FIG. 4, in the retracted position, the foot rest body 118 is located closer to the longitudinal center plane LCP than a plane 136 that extends vertically and abuts the portion of each side cover 88 that is spaced farthest from the longitudinal center plane LCP. The foot rest body 118 is located outward over the plane 136 in the extended position. This arrangement is advantageous because the foot rest bodies 118 are not cumbersome when placed in the retracted position and the second rider S can put his or her feet onto the foot rest bodies 118 relatively easily when the foot rest bodies are located in the extended position.

Figure 11:
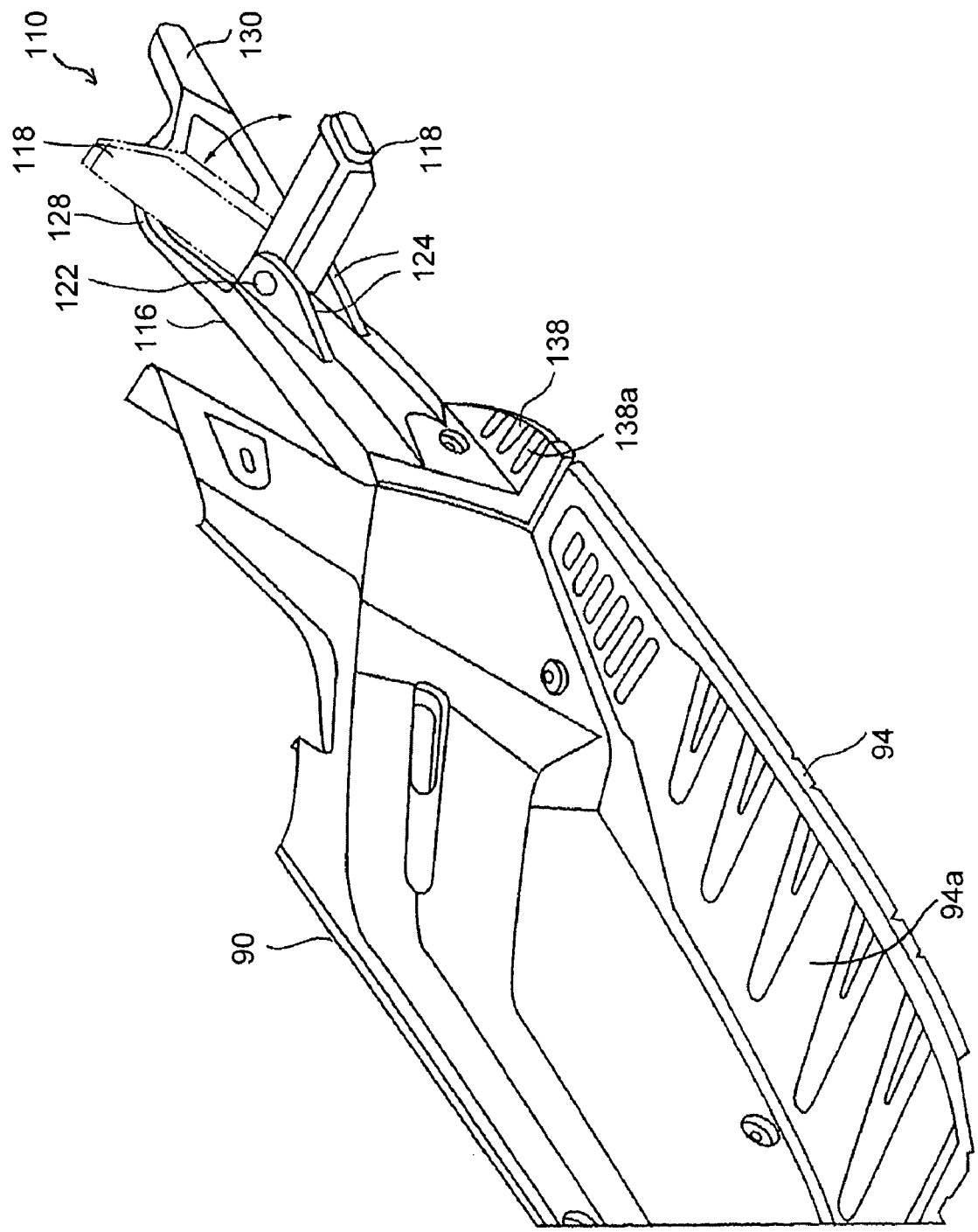
FIG. 11 illustrates a perspective view of the moped showing a lower cover, a foot board and a foot rest assembly on the left hand side of the moped.

With reference to FIGS. 5, 6 and 9-11, each stay 116 preferably includes a foot board portion 138 at the forward portion 116a between the bolt holes 119. As best shown in FIG. 11, the foot board portion 138 includes a horizontal surface 138a that is arranged just behind the horizontal surface 94a of each foot board 94 such that the foot board portion 138 defines a rear portion of the foot board 94. In other words, the horizontal surface 138a of the foot board portion 138 is substantially flush with the horizontal surface 94a of the foot board 94. A peripheral edge of the foot board portion 138 is preferably narrowed rearward toward a rear end of the forward portion 116a. The foot board portions 138 are useful because the primary rider can use a broader area than the area of each foot board 94.

In the illustrated preferred embodiment, each foot rest body 118 is located at the most suitable location without being hampered by the side cover 88 on the same side. Thus, the foot rest assemblies 110 provide a comfortable position for the secondary rider S to put his or her feet on. In addition, the feet of the secondary rider S are securely maintained at the suitable position because the foot rest assemblies 110 are not located too far from the secondary rider S. In addition, the illustrated foot rest bodies 118 are disposed higher than the bolts 119 which fasten the foot rest assemblies 110 to the respective bracket sections 34 of the frame 32. With this arrangement, the bolts 119 are concealed while the foot rest bodies 118 are disposed at a suitable height.

The location of each foot rest body 118 in the illustrated preferred embodiment is slightly shifted rearward as compared to the conventional position at which the foot of the secondary rider is to close to the leg of the primary rider. Because of the shift of the location, the foot of the secondary rider S does not touch the leg of the primary rider when the moped 30 is at a standstill and the primary rider places his or her foot on the ground. Accordingly, both the primary rider and the secondary rider S are not uncomfortable.

With reference to FIGS. 2, 6, 7 and 10, the foot guide 112 is preferably provided, in addition to the foregoing guide projection 130 of the stay 116. It should be noted that both of the foot guide 112 and the guide projection 130 are included in the category of foot guide.

The foot guide 112 preferably extends from a top surface of the resin cover 76 that overlays the top cover 74 of the engine unit 51. Preferably, the foot guide 112 is integrally formed with the cover 76. The illustrated foot guide 112 preferably has a substantially triangular prism shape. The foot guide 112 is preferably arranged adjacent to the guide projection 130. Preferably, a top portion extends continuously from the guide projection 130 from a side view. The illustrated foot guide 112 is disposed slightly closer to the longitudinal center plane LCP than the guide projection 130.

The foot guide 112 together with the guide projection 130 guides the foot of the second rider S on the left hand side to the proper position of the foot. This is because the foot guide 112 and the guide projection 130 are located behind the foot rest body 118 and block the foot from moving to the top of the engine unit 51. Thus, the second rider S can maintain a proper position while straddling the rear seat portion 62b.

The foot guide 112 may have any other suitable shape other than the substantially triangular prism shape. Also, the guide projection 130 may have any suitable shape. For example, a substantially rectangular or a substantially columnar shape can be used.

Both of the foot guide 112 and the guide projection 130 are provided. However, in some arrangements, either the foot guide 112 or the guide projection 130 by itself is sufficient to guide the foot of the secondary rider S to the proper position.

Although this invention has been disclosed in the context of preferred embodiments, it will be understood by those skilled in the art that the present invention extends beyond the specifically disclosed preferred embodiments to other alternative embodiments and/or uses of the invention and obvious modifications and equivalents thereof. For example, the foot boards are not necessarily boards. In some arrangements, bar type foot rests may replace the foot boards.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the present invention that fall within the true spirit and scope of the invention.

What is claimed is:

1. A vehicle comprising:
a frame including first and second frame sections, the first frame section extending substantially vertically, the second frame section extending substantially horizontally and rearwardly from a top portion of the first frame section;
a seat supported by the second frame section;
a power unit arranged to power the vehicle, the power unit being disposed below the seat;
a side cover arranged to cover the second frame section, the side cover extending along the second frame section to define a space between a bottom of the side cover and a top of the power unit;
a stay extending generally rearwardly from the first frame section, at least a portion of the stay being disposed in the space; and
a foot rest extending from the stay, the stay including first and second portions, the second portion being arranged to be higher than the first portion, the first portion of the stay being attached to the first frame section, the foot rest being attached to the second portion of the stay.

2. The vehicle as set forth in claim 1, wherein the stay extends obliquely upwardly and rearwardly from the first portion.

3. The vehicle as set forth in claim 1, wherein the foot rest is pivotally attached to the stay so as to be moveable between an extended position and a retracted position, the stay includes a third portion disposed at a location that is higher than the second portion, the third portion accommodates the foot rest in the retracted position.

4. The vehicle as set forth in claim 1, wherein the stay includes a foot guide extending generally rearwardly and arranged behind the foot rest.

5. The vehicle as set forth in claim 1, wherein the foot rest is disposed in the space.

6. The vehicle as set forth in claim 1, wherein the foot rest is pivotally attached to the stay so as to be moveable between an extended position and a retracted position, the foot rest extends substantially transversely outward from a side surface of the stay in the extended position.

7. The vehicle as set forth in claim 6, wherein the vehicle has a longitudinal center plane that extends substantially vertically from a front to a rear of the vehicle, the side cover protrudes outward so as to be spaced from the longitudinal center plane, in the retracted position, the foot rest is disposed closer to the longitudinal center plane than a portion of the side cover that is spaced farthest apart from the longitudinal center plane.

8. The vehicle as set forth in claim 1, wherein the power unit includes an engine and a transmission coupled with the engine.

9. The vehicle as set forth in claim 8, wherein the first frame section pivotally supports the power unit.

10. The vehicle as set forth in claim 1, further comprising a foot board, the frame being arranged to support the foot board, the foot board extending forwardly relative to the first frame section.

11. The vehicle as set forth in claim 10, wherein the foot board includes a horizontal surface, and the stay includes another horizontal surface that is substantially flush with the horizontal surface of the foot board.

12. The vehicle as set forth in claim 10, wherein the seat is a tandem seat on which a first rider and a second rider straddle, the foot board receives a foot of the first rider, and the foot rest receives a foot of the second rider.

13. The vehicle as set forth in claim 1, wherein the vehicle has a longitudinal center plane that extends substantially vertically from a front to a rear of the vehicle, the side cover protrudes outward so as to be spaced apart from the longitudinal center plane, and the stay is disposed farther from the longitudinal center plane than a portion of the side cover.

14. A vehicle comprising:
a frame including first and second frame sections, the first frame section extending substantially vertically, the second frame section extending substantially horizontally and rearwardly from a top portion of the first frame section;
a seat supported by the second frame section;
a power unit arranged to power the vehicle, the power unit being disposed below the seat;
a side cover arranged to cover the second frame section, the side cover extending substantially parallel to the second frame section;
a stay extending from the first frame section so as to be disposed below the side cover and above the power unit; and
a foot rest extending from the stay.

15. The vehicle as set forth in claim 14, wherein the stay extends obliquely upwardly and rearwardly from the first frame section.

16. The vehicle as set forth in claim 14, wherein the first frame section pivotally supports the power unit.

17. The vehicle as set forth in claim 14, further comprising a foot board extending in front of the first frame section, the foot board having a generally horizontal surface, and the stay having another horizontal surface that is substantially flush with the horizontal surface of the foot board.

18. The vehicle as set forth in claim 14, wherein the foot rest is pivotally attached to the stay to move between an extended position and a retracted position, the stay includes a rear portion disposed at a location that is higher than a mid portion, the rear portion accommodates the foot rest in the retracted position.

19. The vehicle as set forth in claim 14, wherein the stay includes a foot guide extending generally rearwardly and arranged behind the foot rest.

20. The vehicle as set forth in claim 14, wherein the power unit includes an engine and a transmission coupled with the engine.

* * * * *